US006411885B1

(12) United States Patent
Grizzle et al.

(10) Patent No.: US 6,411,885 B1

(45) Date of Patent: Jun. 25, 2002

(54) HYBRID OPERATING MODE FOR DISI ENGINES

(75) Inventors: Jessy W. Grizzle, Ann Arbor; Jing Sun, Bloomfield, both of MI (US)

(73) Assignee: Ford Global Technologies, Inc., Dearborn, MI (US)

(*) Notice: Subject to any disclaimer, the term of this patent is extended or adjusted under 35 U.S.C. 154(b) by 0 days.

(21) Appl. No.: 09/951,278

(22) Filed: Sep. 13, 2001

Related U.S. Application Data

(62) Division of application No. 09/482,468, filed on Jan. 13, 2000.

(51) Int. Cl.[7] .................................................. B60T 7/12

(52) U.S. Cl. ......................... 701/104; 123/305; 701/105

(58) Field of Search ................................. 701/104, 105, 701/115; 123/305, 295, 443

(56) References Cited

U.S. PATENT DOCUMENTS

| | | | | |
|---|---|---|---|---|
| 5,078,107 A | | 1/1992 | Morikawa | |
| 5,755,198 A | | 5/1998 | Grob et al. | |
| 5,894,726 A | | 4/1999 | Monnier | |
| 5,894,828 A | | 4/1999 | Savashankar et al. | |
| 5,910,096 A | | 6/1999 | Hepburn et al. | |
| 5,924,404 A | | 7/1999 | Ruman et al. | |
| 5,941,211 A | | 8/1999 | Brehob et al. | |
| 5,947,079 A | | 9/1999 | Sivashankar et al. | |
| 5,950,603 A | | 9/1999 | Cook et al. | |
| 5,967,114 A | | 10/1999 | Yasuoka | |
| 5,970,950 A | | 10/1999 | Shimizu et al. | |
| 5,975,047 A | | 11/1999 | Kamura et al. | |
| 6,032,640 A | | 3/2000 | Evans | |
| 6,155,242 A | * | 12/2000 | Kotwick et al. | 123/681 |
| 6,178,945 B1 | | 1/2001 | Suzuki et al. | |
| 6,253,143 B1 | * | 6/2001 | Silvernagle et al. | 123/335 |
| 6,278,933 B1 | * | 8/2001 | Buckland et al. | 123/305 |

FOREIGN PATENT DOCUMENTS

| | | |
|---|---|---|
| EP | 0 491 322 A2 | 6/1992 |
| WO | WO 00/53912 | 9/2000 |

* cited by examiner

*Primary Examiner*—John Kwon

(74) *Attorney, Agent, or Firm*—Allan J. Lippa; John D. Russell

(57) ABSTRACT

A computer readable storage medium having stored data representing instructions for controlling a spark ignited direct injection internal combustion engine having a plurality of cylinders operable in at least homogeneous and stratified modes, includes instructions for determining a desired value for an engine operating parameter based on current engine operating conditions wherein the desired value results in scheduling of an air/fuel ratio between homogeneous range and stratified range of allowable air/fuel ratios, instructions for operating a first portion of the cylinders in the homogenous operating mode, and instructions for operating a second portion of the cylinders in the stratified operating mode such that a combined air/fuel ratio associated with the first and second portions of the cylinders approaches the scheduled air/fuel ratio.

20 Claims, 2 Drawing Sheets

HYBRID OPERATING MODE FOR DISI ENGINES

This is a divisional of copending application Ser. No. 09/482,468, filed on Jan. 13, 2000.

TECHNICAL FIELD

The present invention relates to a system and method for controlling a direct injection spark ignition internal combustion engine.

BACKGROUND ART

Direct injection spark ignition (DISI) internal combustion engines may be operated in various modes depending upon the particular objectives to be attained at any particular time with emphasis on power output, fuel economy, and/or low emissions, for example. Operating modes may include a homogeneous mode in which the combustion chambers contain a substantially homogeneous mixture of air and fuel, or a stratified mode in which the combustion chambers contain stratified layers of different air/fuel mixtures. Stratified mode generally includes strata containing a stoichiometric air/fuel mixture nearer the spark plug with lower strata containing progressively leaner air/fuel mixtures.

Typically, there is a range of air/fuel ratios within which stable combustion can be achieved in the stratified mode, such as between 25:1 and 40:1, and a second range in which stable combustion can be achieved in the homogeneous mode, such as between 12:1 and 20:1. As such, there is typically a significant gap between the leanest air/fuel ratio of the homogeneous mode (20 in this example), and the richest air/fuel ratio of the stratified mode (25 in this example). This gap poses a number of problems in selecting.an appropriate operating mode and controlling the engine.

For example, best fuel economy is often associated with highest allowable manifold pressure which may dictate an air/fuel ratio which falls within the gap and is therefore not achievable in either mode of operation. As such, the engine controller operates the engine at a richer air/fuel ratio to maintain stable combustion with a resulting lower fuel economy.

The air/fuel ratio gap between operating modes also poses control challenges to avoid limit cycle behavior in which a small variation in requested torque causes cycling between stratified and homogeneous modes which have a large variation in associated air/fuel ratios.

SUMMARY OF THE INVENTION

An object of the present invention is to provide a system and method for controlling a DISI engine using a hybrid operating mode based on operation of the engine over a number of engine events, such as cylinder firings or cycles.

In carrying out the above object and other objects, advantages, and features of the present invention, a method for controlling a spark ignited direct injection internal combustion engine having a plurality of cylinders operable in at least a homogeneous operating mode with a homogeneous air/fuel mixture and an associated range of allowable homogeneous air/fuel ratios and a stratified mode with a stratified air/fuel mixture and an associated range of allowable stratified air/fuel ratios is provided. Typically, the homogeneous range and stratified range of allowable air/fuel ratios do not overlap and are widely separated. The method includes determining a desired value for an engine operating parameter based on current engine operating conditions wherein the desired value results in scheduling of an air/fuel ratio between the homogeneous range and stratified range of allowable air/fuel ratios. The method also includes operating a first portion of the cylinders in the homogenous operating mode, and operating a second portion of the cylinders in the stratified operating mode such that a combined air/fuel ratio associated with the first and second portions of the cylinders approaches the scheduled air/fuel ratio. In one embodiment, the engine operating parameter is engine torque. The operating mode of each cylinder is selected to provide a desired average engine torque over multiple engine events, such as cylinder firings.

The present invention provides a number of advantages over prior art control strategies. For example, the present invention provides an additional degree of freedom in torque control without additional sensor/actuator cost. The present invention provides an alternative strategy to multiple injections to effectively close the air/fuel ratio gap between stratified and homogeneous operating modes to increase engine efficiency.

The above advantages and other advantages, objects, and features of the present invention, will be readily apparent from the following detailed description of the best mode for carrying out the invention when taken in connection with the accompanying drawings.

BEST MODE(S) FOR CARRYING OUT THE INVENTION

Figure 1:
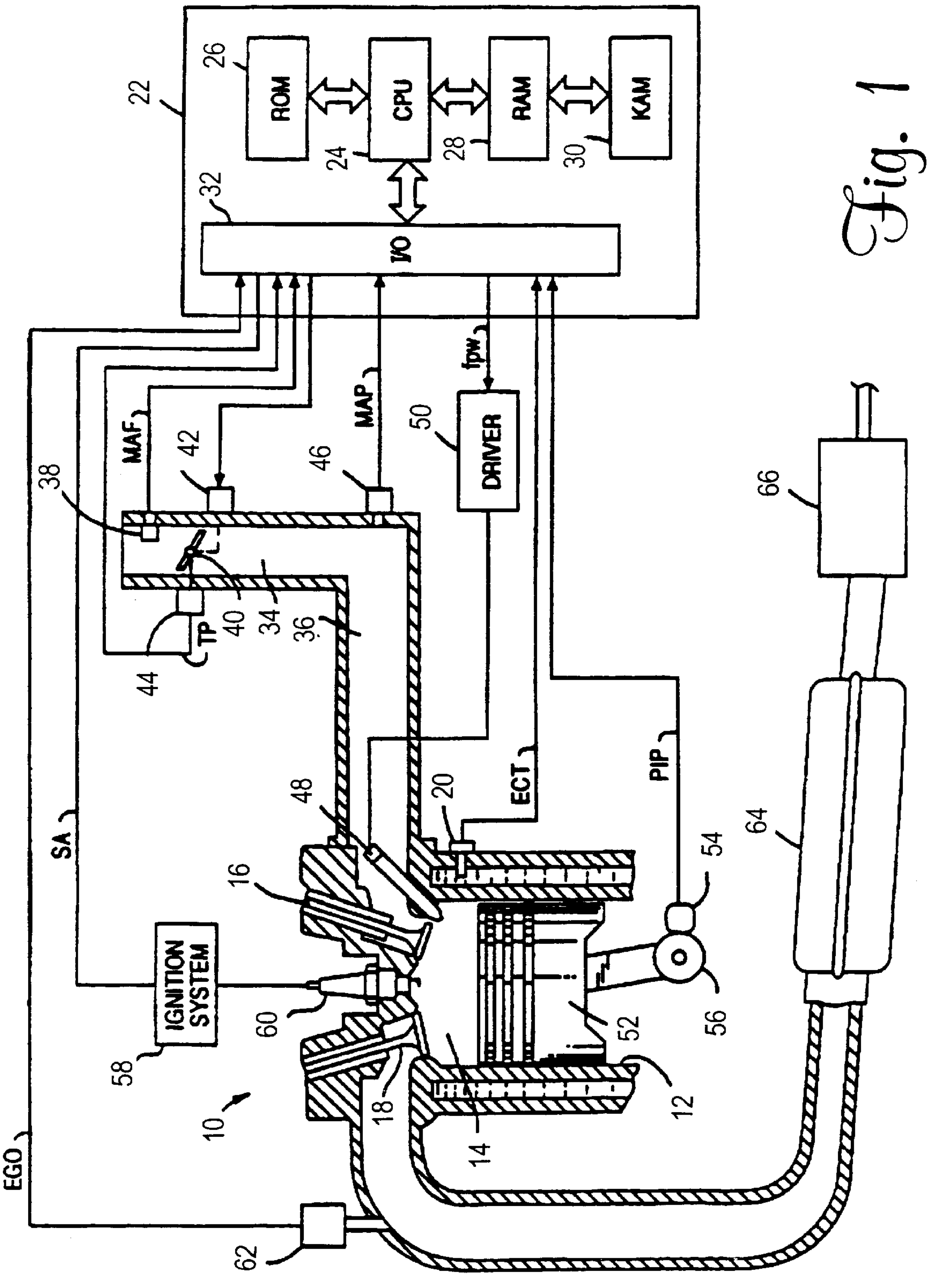
FIG. 1 is a block diagram illustrating an engine control system for a DISI engine according to the present invention.

A block diagram illustrating an engine control system for a DISI engine according to the present invention is shown in FIG. 1. System 10 is preferably an internal combustion engine having a plurality of cylinders, represented by cylinder 12, having corresponding combustion chambers 14. As one of ordinary skill in the art will appreciate, system 10 includes various sensors and actuators to effect control of the engine. One or more sensors or actuators may be provided for each cylinder 12, or a single sensor or actuator may be provided for the engine. For example, each cylinder 12 may include four actuators which operate the intake valves 16 and exhaust valves 18. However, the engine may only include a single engine coolant temperature sensor 20.

System 10 preferably includes a controller 22 having a microprocessor 24 in communication with various computer-readable storage media. The computer readable storage media preferably include a read-only memory (ROM) 26, a random-access memory (RAM) 28, and a keep-alive memory (KAM) 30. The computer-readable storage media may be implemented using any of a number of known memory devices such as PROMs, EPROMs, EEPROMs, flash memory, or any other electric, magnetic, or optical memory capable of storing data used by microprocessor 24 in controlling the engine. Microprocessor 24 communicates with the various sensors and actuators via an input/output (I/O) interface 32.

In operation, air passes through intake 34 where it may be distributed to the plurality of cylinders via an intake manifold, indicated generally by reference numeral 36. System 10 preferably includes a mass airflow sensor 38 which provides a corresponding signal (MAF) to controller 22 indicative of the mass airflow. A throttle valve 40 is used to modulate the airflow through intake 34. Throttle valve 40 is preferably electronically controlled by an appropriate actuator 42 based on a corresponding throttle position signal generated by controller 22. A throttle position sensor 44 provides a feedback signal (TP) indicative of the actual position of throttle valve 40 to controller 22 to implement closed loop control of throttle valve 40.

A manifold absolute pressure sensor 46 is used to provide a signal (MAP) indicative of the manifold pressure to controller 22. Air passing through intake manifold 36 enters combustion chamber 14 through appropriate control of one or more intake valves 16. Intake valves 16 and exhaust valves 18 may be controlled by controller 22 for variable cam timing applications. Alternatively, intake valves 16 and exhaust valves 18 may be controlled using a conventional camshaft arrangement. A fuel injector 48 injects an appropriate quantity of fuel in one or more injection events for the current operating mode based on a signal (FPW) generated by controller 22 and processed by driver 50.

As illustrated in FIG. 1, fuel injector 48 injects an appropriate quantity of fuel in one or more injections directly into combustion chamber 14. Control of the fuel injection events is generally based on the position of piston 52 within cylinder 12. Position information is required by an appropriate sensor 54 which provides a position signal (PIP) indicative of rotational position of crankshaft 56.

According to the present invention, the operating mode of each cylinder or group (portion) of cylinders may be based on the current operating conditions to obtain a desired value for an engine operating parameter, such as torque. As such, each cylinder 12 may be operated in homogeneous mode such that a substantially homogeneous mixture of air and fuel exists within combustion chamber 14, or in stratified mode in which combustion chamber 14 includes various strata having different air/fuel mixtures or ratios. At the appropriate time during the combustion cycle, controller 22 generates a spark signal (SA) which is processed by ignition system 58 to control spark plug 60 and initiate combustion within chamber 14. Controller 22 (or a conventional camshaft) controls one or more exhaust valves 18 to exhaust the combusted air/fuel mixture through an exhaust manifold. An exhaust gas oxygen sensor 62 provides a signal (EGO) indicative of the oxygen content of the exhaust gases to controller 22. This signal may be used to adjust the air/fuel ratio, or control the operating mode of one or more cylinders. The exhaust gas is passed through the exhaust manifold and through a catalytic converter 64 and $NO_x$ trap 66 before being exhausted to atmosphere.

As known, direct injection spark ignition engines such as illustrated in FIG. 1 may generally be operated in at least two modes of operation. To maintain stable combustion, the air/fuel ratio should be controlled to be between about 25:1 and 40:1 in the stratified mode of operation. For stable combustion in the homogeneous mode, the air/fuel ratio should be controlled to be between about 12:1 and 20:1. As such, there is typically a gap between the two air/fuel ranges associated with stable combustion. The present invention provides for operating a first portion of cylinders in the homogeneous mode and a second portion of cylinders in the stratified mode based on achieving a desired value of an engine operating parameter, such as engine torque, over multiple engine events. Engine events may include cylinder firings, engine cycles, or crankshaft revolutions, for example. Preferably, the control variable is averaged over multiple engine events such that controller 22 may determine an appropriate spark, air/fuel ratio, exhaust gas recirculation (EGR), and the like to achieve a desired average value for the controller. For example, in a four-cylinder engine, the present invention allows two cylinders to operate in the homogeneous mode with an air/fuel ratio of about 20:1 and two cylinders to operate in the stratified mode with an air/fuel ratio of about 25:1 to meet a desired average engine torque. In effect, the engine is operating at an average or mean air/fuel ratio of about 22.5:1 which is higher than the air/fuel ratio of about 20 which would be imposed absent the teachings of the present invention. As such, the present invention may result in improved efficiency by providing an additional degree of freedom for torque control, i.e. eliminating the previous air/fuel ratio constraints imposed by operating in either the homogeneous or stratified operating modes.

Figure 2:
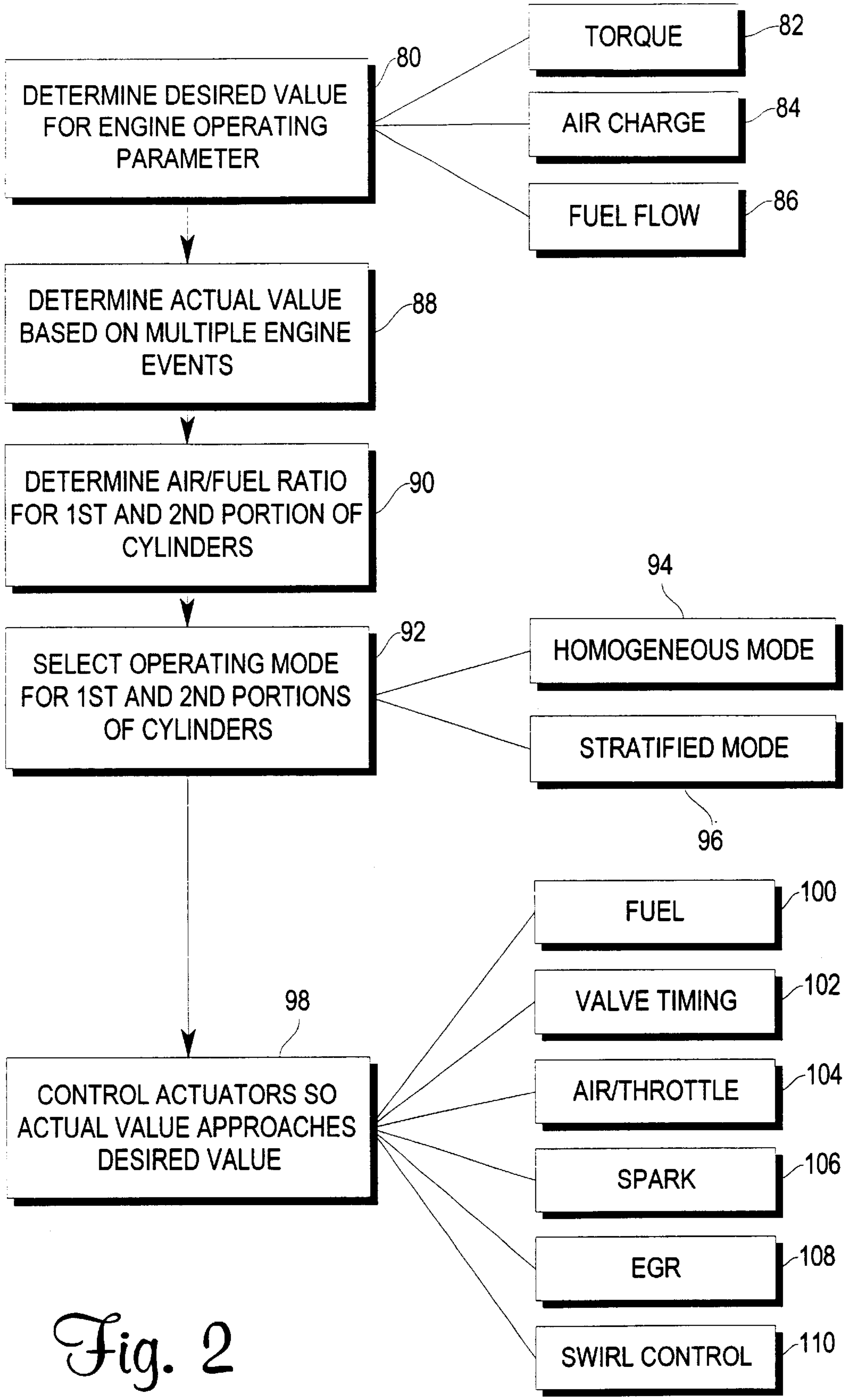
FIG. 2 is a diagram illustrating operation of a system and method for controlling a DISI engine by providing a hybrid operating mode according to the present invention.

A diagram illustrating operation of a system and method for controlling a DISI engine by providing a hybrid operating mode according to the present invention is shown in FIG. 2. The diagram of FIG. 2 represents control logic of one embodiment of a system or method according to the present invention. As will be appreciated by one of ordinary skill in the art, the diagram of FIG. 2 may represent any of a number of known processing strategies such as event-driven, interrupt-driven, multi-tasking, multi-threading, and the like. As such, various steps or functions illustrated may be performed in the sequence illustrated, in parallel, or in some cases omitted. Likewise, the order of processing is not necessarily required to achieve the objects, features, and advantages of the invention, but is provided for ease of illustration and description. Preferably, the control logic is implemented in software which is executed by a microprocessor-based engine controller. Of course, the control logic may be implemented in software, hardware, or a combination of software and hardware depending upon the particular application. When implemented in software, the control logic is preferably provided in a computer-readable storage medium having stored data representing instructions executed by a computer to control the engine. The computer-readable storage medium may be any of a number of known physical devices which utilize electric, magnetic, and/or optical storage to keep executable instructions and associated calibration information, operating variables, and the like.

Block 80 represents determining a desired value for an engine operating parameter based on current engine operating conditions which may include driver demand. The present invention allows a determination of a desired value which results in scheduling of an air/fuel ratio between the homogeneous range and stratified range of allowable air/fuel ratios. The engine operating parameter may be any of a number of parameters, including torque 82, air charge 84, and fuel flow 86. For example, a desired value for indicated engine torque may be determined as represented by blocks 80 and 82. The present invention may also be used to control air charge as represented by block 84. In variable cam timing applications, air charge may be controlled by modifying the valve timing. Air charge may also be controlled in electronic throttle applications by controlling the throttle valve position. Alternatively, conventional valve control engines may implement fuel flow control as represented by block 86.

A value indicative of the actual value for the selected engine operating parameter is determined based on multiple engine events as represented by block 88. Preferably, the value indicative of the actual value is based on a plurality of engine events rather than based on a single engine event.

For example, if the engine operating parameter is torque, it is presumed that drivability will not be deteriorated if the average indicated torque over a plurality of engine events is controlled to a relatively constant value based on current operating conditions, despite the occurrence of a jump in torque on the engine event time scale. The instantaneous indicated torque at time t may be represented by:

$$T^i(t)=T^i(\text{spark}(t), A/F(t), \text{air}(t), EGR(t), N(t))$$

where $T^i$ represents the instantaneous indicated torque at time t which is a function of the instantaneous spark, air/fuel ratio, airflow, EGR, and engine speed.

The average torque over T engine events may then be determined according to:

$$T^i_{avg}(t) = \frac{1}{E}\sum_{j=1}^{E} T^i(spark(t_j), A/F(t_j), air(t_j), EGR(t_j), N(t_j))$$

where an engine event represents a cylinder firing, engine cycle, crankshaft revolution, or the like.

According to the present invention, the engine controller is free to adjust various other engine control parameters including spark, air/fuel ratio, airflow, and EGR such that the average value for engine torque approaches the desired value while improving fuel economy and achieving acceptable engine performance. This may result in one or more cylinders being operated in a first operating mode, such as a homogeneous mode, and a second cylinder or group of cylinders being operated in a second operating mode, such as stratified mode. As such, the combined air/fuel ratio associated with the first and second groups or portions of the cylinders approaches the scheduled air/fuel ratio which is not constrained by the ranges for stable combustion associated with the homogeneous mode and stratified mode of operation.

Once the desired values and actual values for the engine operating parameter are determined as represented by blocks 80 and 88, various other parameters may be controlled such that the actual value approaches the desired value as represented by block 98. This may include determination of an air/fuel ratio for the first and second groups or portions of cylinders as represented by block 90. Likewise, an appropriate operating mode for the first and second portions of cylinders may be determined as represented by block 92. Operating modes may include a homogeneous mode 94, and a stratified mode 96, among others. Block 98 then controls the various actuators which may influence control of fuel 100, valve timing 102, airflow (throttle position) 104, spark 106, EGR 108, and/or swirl control 110. As known, fuel control 100 may include controlling the fueling rate and injection timing relative to position of the piston within the cylinder. Likewise, swirl control 110 may include control of one or more swirl valves.

As such, the present invention provides an alternative strategy to multiple injections to effectively close the air/fuel ratio gap between stratified and homogeneous operating modes to improve engine efficiency and authority of control. By removing the constraints placed on air/fuel ratios for stable combustion in homogeneous and stratified operating modes, the present invention provides an additional degree of freedom which may be used by the engine controller. As such, improved fuel economy may result since the engine controller is allowed to operate the engine at an optimum air/fuel ratio for current operating conditions which may result in a higher manifold pressure and reduced pumping losses.

While the best mode for carrying out the invention has been described in detail, those familiar with the art to which this invention relates will recognize various alternative designs and embodiments for practicing the invention as defined by the following claims.

What is claimed is:

1. A computer readable storage medium having stored data representing instructions executable by a computer to control a spark ignited direct injection internal combustion engine having an air intake with a throttle valve positioned therein and a plurality of cylinders operable in at least a homogeneous operating mode with a homogeneous air/fuel mixture and an associated range of allowable homogeneous air/fuel ratios and a stratified mode with a stratified air/fuel mixture and an associated range of allowable stratified air/fuel ratios, wherein the homogeneous range and stratified range do not overlap, the computer readable storage medium comprising:

- instructions for determining a desired value for an engine operating parameter based on current engine operating conditions wherein the desired value results in scheduling of an air/fuel ratio between the homogeneous range and stratified range of allowable air/fuel ratios;
- instructions for operating a first portion of the cylinders in the homogenous operating mode; and
- instructions for operating a second portion of the cylinders in the stratified operating mode such that a combined air/fuel ratio associated with the first and second portions of the cylinders approaches the scheduled air/fuel ratio.

2. The computer readable storage medium of claim 1 wherein the instructions for operating the first and second portions of cylinders comprise instructions for operating the first and second portions of cylinders such that an average air/fuel ratio approaches the scheduled air/fuel ratio.

3. The computer readable storage medium of claim 1 wherein the engine operating parameter is engine torque.

4. The computer readable storage medium of claim 1 wherein the engine operating parameter is spark.

5. The computer readable storage medium of claim 1 wherein the engine operating parameter is manifold pressure.

6. The computer readable storage medium of claim 1 wherein the engine operating parameter is fuel.

7. The computer readable storage medium of claim 1 wherein the engine operating parameter is air flow.

8. The computer readable storage medium of claim 1 further comprising instructions for controlling fuel, spark, manifold pressure, or airflow such that the combined air/fuel ratio approaches the scheduled air/fuel ratio and a current value of the engine parameter approaches the desired value.

9. A computer readable storage medium having stored data for controlling a spark ignited engine having a plurality of cylinders operable in a homogeneous operating mode with a homogeneous air/fuel mixture and a stratified operating mode with a stratified air/fuel mixture, the computer readable storage medium comprising:

- instructions for determining a desired value for an engine operating parameter;
- instructions for determining a value indicative of the actual value for the engine operating parameter based on multiple engine events; and
- instructions for selecting a first operating mode for a first portion of the plurality of cylinders and a second operating mode for a second portion of the cylinders so that the value indicative of the actual value for the engine operating parameter approaches the desired value for the engine operating parameter.

10. The computer readable storage medium of claim 9 wherein the instructions for determining a desired value for an engine operating parameter comprise instructions for determining a desired engine torque; and wherein the instructions for determining a value indicative of the actual value for the engine operating parameter include instructions for determining an average engine torque.

11. The computer readable storage medium of claim 10 wherein the instructions for determining the average engine torque comprise instructions for determining the average engine torque based on airflow, spark, air/fuel ratio, engine speed, and exhaust gas recirculation.

12. The computer readable storage medium of claim 9 wherein the instructions for controlling the engine comprise instructions for controlling at least one of the air, fuel, and spark.

13. The computer readable storage medium of claim 9 wherein the instructions for determining a value indicative of the actual value comprise instructions for determining an average value for the engine operating parameter.

14. The computer readable storage medium of claim 9 wherein the first operating mode comprises the homogeneous operating mode.

15. The computer readable storage medium of claim 9 wherein the first operating mode comprises the stratified operating mode.

16. The computer readable storage medium of claim 9 wherein the first and second operating modes comprise the homogeneous and stratified operating modes.

17. A computer readable storage medium having stored data representing instructions executable by a computer for controlling an internal combustion engine having a plurality of cylinders operable in one of a plurality of operating modes, the computer readable storage medium comprising:

instructions for determining a desired value for an engine operating parameter;

instructions for operating at least one of the plurality of cylinders in a first one of the plurality of operating modes; and instructions for operating at least one other cylinder of the plurality of cylinders in a second one of the plurality of operating modes such that a current value of the engine operating parameter approaches the desired value based on a combined contribution of the plurality of cylinders.

18. The computer readable storage medium of claim 17 further comprising instructions for controlling at least one of fuel, spark, manifold pressure, and airflow such that a combined air/fuel ratio approaches a scheduled air/fuel ratio.

19. The computer readable storage medium of claim 17 wherein the engine operating parameter is engine torque.

20. The computer readable storage medium of claim 17 wherein the plurality of operating modes includes at least homogeneous and stratified operating modes.

* * * * *